(12) United States Patent
Berg

(10) Patent No.: US 8,152,404 B2
(45) Date of Patent: Apr. 10, 2012

(54) CONSTRUCTIONS MEANS

(75) Inventor: Tomas Berg, Halmstad (SE)

(73) Assignee: Pin2Pin AB, Lund (SE)

( * ) Notice: Subject to any disclaimer, the term of this patent is extended or adjusted under 35 U.S.C. 154(b) by 470 days.

(21) Appl. No.: 11/994,856

(22) PCT Filed: Jul. 5, 2006

(86) PCT No.: PCT/SE2006/000845
§ 371 (c)(1),
(2), (4) Date: May 9, 2008

(87) PCT Pub. No.: WO2007/004965
PCT Pub. Date: Jan. 11, 2007

(65) Prior Publication Data
US 2008/0232899 A1 Sep. 25, 2008

(30) Foreign Application Priority Data
Jul. 5, 2005 (SE) ........................................ 0501554

(51) Int. Cl.
*F16D 1/04* (2006.01)
(52) U.S. Cl. ........ 403/356; 403/311; 403/319; 403/344; 403/170; 403/174
(58) Field of Classification Search .................. 403/309, 403/310, 311, 312, 313, 318, 319, 344, 355, 403/356, 398, 169, 170, 171, 174, 176, 49, 403/381
See application file for complete search history.

(56) References Cited

U.S. PATENT DOCUMENTS

| 626,223 | A | * | 6/1899 | Cramp | 403/311 |
|---|---|---|---|---|---|
| 793,922 | A | * | 7/1905 | Deutsch | 403/344 |
| 809,327 | A | * | 1/1906 | Rieske | 138/99 |
| 915,370 | A | * | 3/1909 | McNiel | 403/311 |
| 2,234,222 | A | | 3/1941 | Baerer | |
| 3,054,646 | A | | 9/1962 | Monor | |
| 3,737,180 | A | * | 6/1973 | Hayes et al. | 285/197 |
| 3,916,507 | A | | 11/1975 | Grath | |
| 4,189,810 | A | * | 2/1980 | Beziat | 403/344 |
| 4,402,345 | A | * | 9/1983 | Twort | 138/149 |
| 5,957,744 | A | | 9/1999 | Mott et al. | |
| 6,128,876 | A | * | 10/2000 | Nitschke et al. | 403/174 |

FOREIGN PATENT DOCUMENTS

| FR | 756551 | 12/1993 |
|---|---|---|
| GB | 1120606 | 7/1968 |

* cited by examiner

*Primary Examiner* — Michael P Ferguson
(74) *Attorney, Agent, or Firm* — Capitol City TechLaw

(57) ABSTRACT

A construction element in the form of an openable clamping element (1) being applicable to a primary object and including at least one clamping element (1) surrounding the primary object and a locking element, characterized in that the clamping element (1) contains at least one partition slot being a parting line of the clamping element, and a locking bar (8) being introducible into the slot, whereby the slot is oriented in parallel to the through going axis of the clamping element.

16 Claims, 14 Drawing Sheets

CONSTRUCTIONS MEANS

BACKGROUND OF THE INVENTION

1. Field of the Invention

The present invention relates to a means for quick mounting and quick demounting joining around an item by means of surrounding clamping action.

2. Description of Related Art

It is well known that a ring which is tensioned around an object can be secured in a very robust way. Such rings are called clamping rings herein. The desire concerning these clamping rings are that they should be readily mounted at a desired site and position on the object, that they shall have a high strength and be safely secured thereto, that it shall be simple to attach other objects thereto as well as it shall, if so needed, be simple to demount the element. These types of elements, often in ring shape, are used e.g., when mounting post mounted road signs, cable clips at automotive batteries, post mounted traffic lights, fastening means for motorcycle accessories etc. Hose clamps belong to this category as well.

Toy construction systems are a technical field as well where clamping rings can be used efficiently.

Openable clamping rings are present in construction systems such as the construction system FAC, at traffic signs, presentation stands in shops, mounting means for motor cycle accessories, scaffoldings, and certain construction system for building stages to present concerts and temporary exhibition halls etc. Hereby clamping rings are intended which are most often brought around tubes, cylindrical bars, or other objects having a cylindrical shape. Common to many of them is that the clamping effect is obtained by means of one or more screws being oriented perpendicular to the throughgoing axis of the ring and are placed at the periphery of the clamping ring. Particularly common are five variant types. The first variant consists of two equal parts which are joined in a common parting line, which cuts the through going axis of the ring, in this variant there are screws passing perpendicularly through this parting line at both sides of the through going axis of the ring. The second variant has a hinge the axis of which is present at the periphery of the ring, and where the hinge axis is oriented in parallel to the through going axis of the ring. This hinge replaces the screw or screws on one side of the through going axis of the ring. The shackles of old days were construed according to this principle even though they were construed to clamp but to surround only. The third variant is similar to the hinge variant but in this case the hinge is designed as two flat bars where one has a rectangular hole and the other one has a protrusion having a rectangular cross-section fitting into the said hole. The flat bars are bent in such a way that they fit around the intended object and the parts having protrusion and hole respectively are bent in such a way that they may easily hook into each other to replace the screws on one side of the clamping element. The fourth variant which inter alia is present in the construction system FAC lacks hinge and the clamping effect is in stead obtained by at least one of two ring elements is provided with supporting heads placed outside the screws in the parting line. The supporting heads will then form a counter dolly to provide a clamping effect in the element. The fifth variant is called hose clamp which in turn is present in a number of variants. Commonly present are hose clamps having a screw feeding together a metal band provided with thread slots. The screw is placed at the periphery of the element, as well, and is oriented in such a way that its axis is perpendicular the through going axis of the element.

The object to be able to mount and demount the clamping rings in an easy way is normally solved in that the element can be opened and closed or be brought apart and be brought together. Straining the element in some way so that a friction joint is created between the element and the object it surrounds most often solves the object that it shall be fixed firmly. The known technology, which the present invention is based upon is thus all types of openable or demountable clamping rings the function of which is based on a friction joint and which is intended to be used as fastening means to be able to attach one or more objects to another.

U.S. Pat. No. 3,737,180 relates to a tube joining unit having a hinge side and a joining side, whereby the joint is made of two units having through going holes for receiving a locking unit. The through going holes have conicities for guiding the locking means. The object of the reference is to be able to insert a side wise directed tube on a tube, such as water tube.

U.S. Pat. No. 3,054,646 relates to a split collar having a locking unit cooperating with a wedge element, wherein the locking element shows fracture inducing crossing lines.

U.S. Pat. No. 2,234,222 relates to a split collar as well having a similar locking unit as the one of U.S. Pat. No. 3,054,646.

FR 756551 shows a locking element similar to the two preceeding ones.

GB 1120606 discloses a sun shade consisting of circular, polygonal of quadratic sun shade elements being joined to each other via joining elements introduced into slots present in the sun shade elements. These slots do not provide any partitions.

BRIEF SUMMARY OF THE INVENTION

The Problem, Which The Invention Intends To Solve

A preferred product application of the present invention is considered to be a toy construction system for kids, by means of which they can construe a great amount of objects having an intended form and function. Simultaneously, strength and other performances of the construction element so high that there are a great number of possible application possibilities outside the toy market, whereby a couple of further examples of preferred product applications are scaffoldings and product stands in shops.

Common to most of the more readily demountable openable clamping rings is that the clamping function is obtained by using screws. These screws are either present in the periphery of the clamping element and are oriented perpendicularly to the through going axis of the clamping element and are directed perpendicularly to a plane which is common to this axis or the screw/screws are oriented in such a way that the through going axis of the screw is parallel to this plane, in which cases the end of the screw is fixed directly or indirectly to the object present in the element. Common to all these models having screws is that one needs a tool to handle the screw or some sort of finger nut or other type of substantial screw head on the screw.

SUMMARY OF THE PRESENT INVENTION

This invention replaces the screw function present in clamping rings of the prior art by providing a wedge system to the clamping element which system is considerably faster, smoother, and more simple either to mount and strain the clamping element or to demount it, than what is possible having a clamping element where e.g., screws are used to obtain a clamping action.

The present invention is an openable clamping ring, which facilitates a rapid attachment to objects having many types of cross-sectional profile and form. The figures show clamping rings for attachment upon cylindrical objects having a given diameter. In the following the invention will be described for the sake of simplicity only in figures and text in relation to cylindrical objects even though it will be most excellent to design variants of the clamping elements fitting to many different cross-sectional profiles and shapes.

DETAILED DESCRIPTION OF THE PRESENT INVENTION

Thus the present invention relates to a construction element in the form of an openable clamping element being applicable to a primary object and comprising at least one clamping element surrounding the primary object and a locking means, whereby the construction element is characterized in that the clamping element contains at least one dived slot being a parting line of the clamping element, and a locking bar being introducible into said slot, whereby said slot is oriented in parallel to the through going axis of the clamping element.

In a preferred embodiment the slot is a through going, substantially cylindrical hole placed in the partition slot.

In a preferred embodiment the hole and a locking pin have chamfers to the formation of a wedge system.

In a further preferred embodiment the slot is a through going undercut slot having a substantially circular cross-section and being placed in the partition slot.

In a preferred embodiment the clamping element comprises two identically equal halves, each provided with at least one partition undercut slot and two locking bars introducible into these slots.

In a preferred embodiment the clamping element comprises two different but mutually symmetrical halves, of which one half is provided with a partition undercut slot at each end, and one half is provided with two undercut slots at both ends and two locking bars being introducible into these slots.

In a preferred embodiment the undercut partition slots and said locking bar chamfers to the formation of a wedge system.

In a preferred embodiment the locking bar reaches through at least 80% of the total length of the slot.

In a preferred embodiment the profile of the locking bar is designed in such a way that it completely or partly reaches the surface of the profile of the slot.

In a preferred embodiment the said clamping element and locking bar are provided with a peripheral second slot being radially directed towards the axis of the construction element and being arranged to receive a second locking means.

In a preferred embodiment the said clamping element is provided with a number of undercut, substantially parallel arranged slots arranged to receive further means having a profile being in accordance with the profile of the locking bar.

In a preferred embodiment there are 1, 2, 3, 4, 5, 6, 7, 8, 9 or 10 undercut slots besides said partition slot.

In a preferred embodiment the slot of the clamping element has a slot profile the narrower part of which has a width corresponding to 40 to 80%, preferably 65 to 70% of the widest part of the slot profile.

In a preferred embodiment the partition slots as well as the other undercut slots of the longitudinal direction of the element 0.5 to 10% narrower at the middle thereof.

In a preferred embodiment the partition slots as well as the other undercut slots of the longitudinal direction of the element 1 to 6% narrower at the middle thereof.

In a preferred embodiment each end of the clamping element shows a protrusion as well as a recess, respectively.

In a preferred embodiment the clamping element is in one piece having one partition slot.

In a preferred embodiment the clamping element is present in more subparts, each provided with partition slots.

In a preferred embodiment the clamping element is two surrounding part element, which at their one side has a common hinge part, and at its other side shows a partition slot.

In a preferred embodiment the angle of the chamfers of the partition slots equal to the chamfers of the locking bar.

In a preferred embodiment the angle of the chamfers of the partition slots is between 0.5 to 25 degrees to the through going axis of the partition slot. Different materials and differently desired clamping forces provides for the large angle range.

In a preferred embodiment made of injection moulded polymer the angle of the chamfers of the partition slots is between 15 to 17 degrees to the through going axis of the partition slots.

The openable clamping ring related to this invention can be clamped together in the corresponding way as the ring according to the prior art but with the difference that the clamping action is not obtained by means of screws but by means of a locking bar fitting into a partition undercut slot, preferably undercut slot, in at least one of the partition sites of the clamping element, which slot is oriented in parallel to the through going axis of the clamping element, and has its open part facing the outer side of the element. Chamfers present in the partition undercut slot and in the locking bar is a wedge system creating this clamping action.

The design of the locking means is characterized in that it has a locking bar fitting into the partition slots and which reaches 80 to 100% of the total length of the partition slots when the locking bar has been mounted therein. The profile of the locking bar can be designed in such a way that it partly or completely reaches the surface of the wider part of the profile of the partition slots and has one part which is housed in the waist of the slot profile. The partition slots need not be open towards the periphery of the clamping ring but can be designed as a hole having the same position and orientation as said partition slots. For reason of simplicity these different variants will be called partition slots, as well.

The partition slots are further characterized in that they have chamfers on both sides of the protrusion, which chamfers are placed on the side of the partition slot being closest to the outer end of the protrusion when the partition slots pass through one end of the ring with one protrusion only. Those partition slots that pass through at least two protrusions are characterized in that they have each their chamfer being placed on that side of the partition slot being closest the outer end of the protrusion and closest to the surfaces which are the intermediate surfaces between the protrusions.

BRIEF DESCRIPTION OF THE DRAWINGS

The present invention will be described more in detail in the following with reference to some preferred embodiments, however, without being restricted thereto.

DESCRIPTION OF THE PREFERRED EMBODIMENTS

Figure 1:
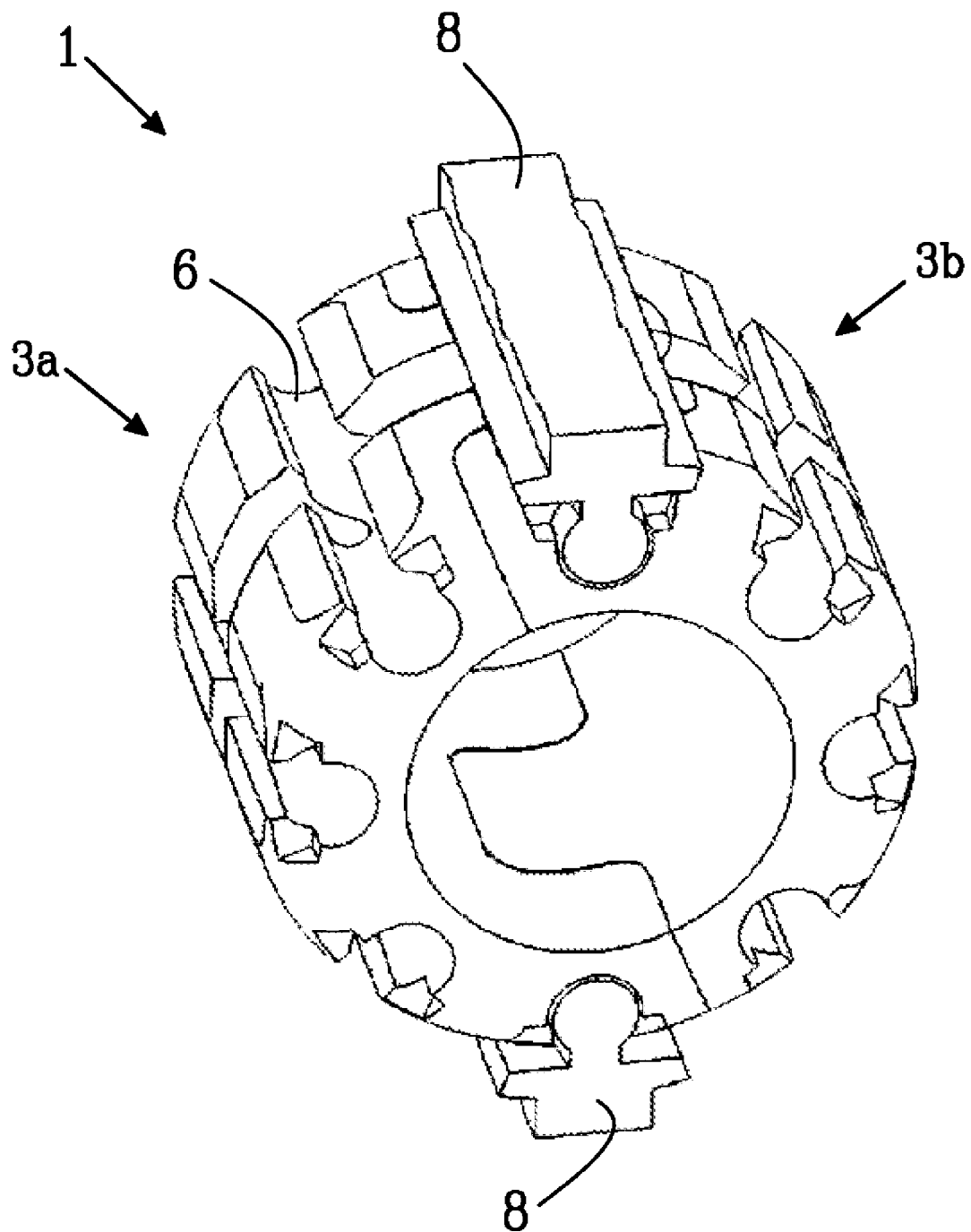
FIG. 1 shows a clamping ring having been brought together.
Figure 2:
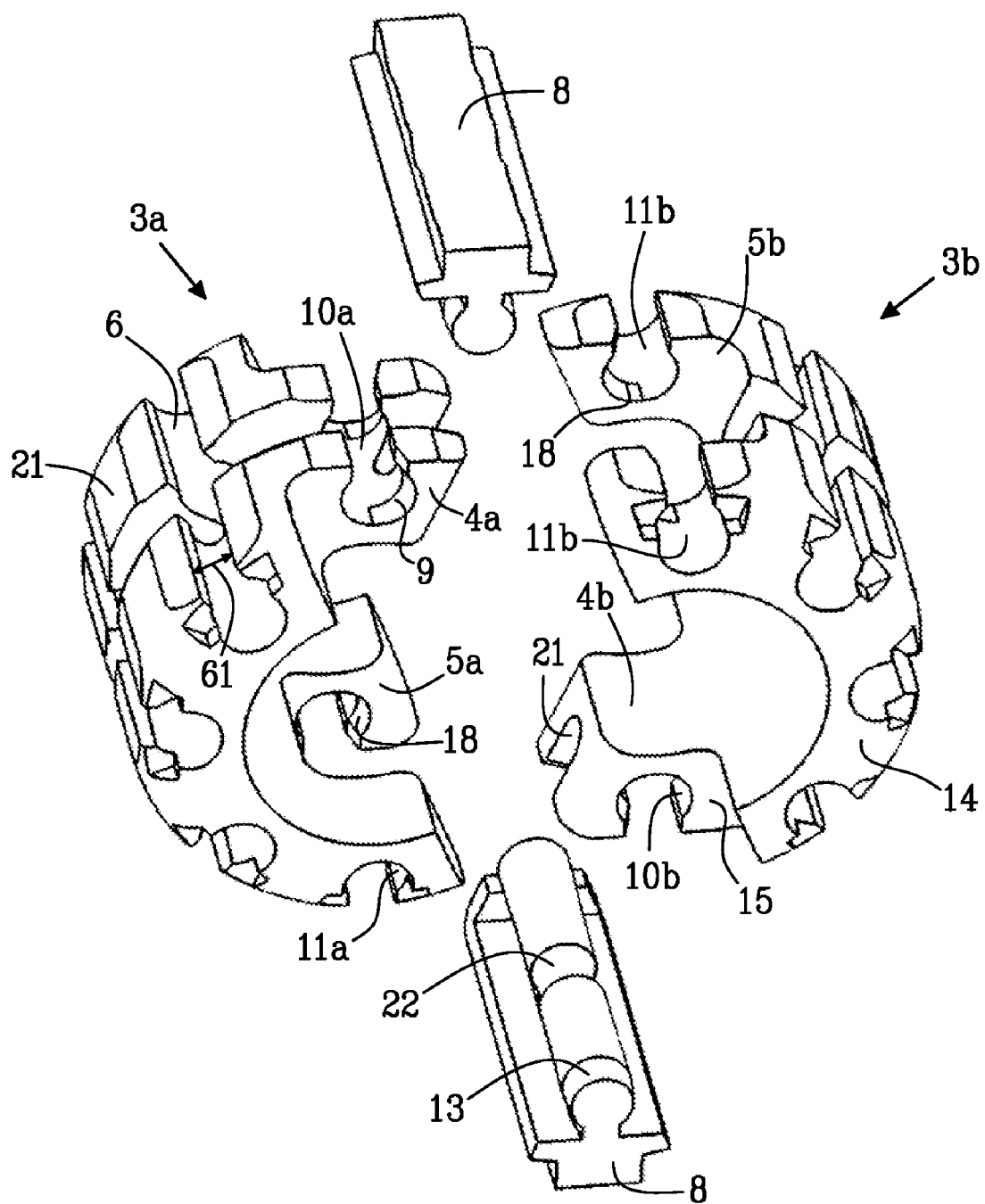
FIG. 2 shows an exploded diagram of a clamping ring.

The Clamping Element Has Been Contrued In Accordance With The Following

The clamping element 1 has been designed as an openable ring as shown In FIGS. 1 to 16, which element can be secured to e.g., cylindrical objects 2 (e.g., round staffs or wires). The clamping element 1 consists of, in this embodiment, of two identically equal parts, which will be named "ring halves" 3*a* and 3*b*, in the following.

One end of the ring halves 3*a* and 3*b* are provided with a protrusion 4, while the other end thereof is provided with a recess 5. The two ring halves 3*a* and 3*b* are joined onto a cylindrical object 2 by placing first one ring half 3*a* and then the further equal ring half 3*b* (cf FIGS. 3 to 7) to the cylindrical object 2 with or without a snapping effect, which will be explained further below, whereby the protrusion 4*a* is brought into the corresponding recess 5*ab* and the protrusion 4*b* is brought into the corresponding recess 5*a* and are locked to each other in accordance with the explanation below. It shall be noted that the clamping means need not be snapped onto the cylindrical object 2 but can be loosely attached thereto. The clamping means need not be lockingly secured to the object 2, but may be applied with a sliding play thereto, if so desired from a constructional point of view.

Around the outer side of the clamping means there are a number of undercut slots 6 which run in parallel to the through going axis 7 of the clamping means. In this embodiment two of the slots of the clamping means parted into protrusion slot 10 and recess slot 11, which together form the partition 12. The ring halves 3*a* and 3*b* are fixed and mutually clamped together be introducing locking bars 8 into the respective partition slots 12. When the inner diameter of the clamping element 1 is somewhat lesser than the outer diameter of the cylindrical object 2, to which the clamping element 1 is adapted, the partition slots 12 will not completely become aligned at the mounting.

Figure 3A:
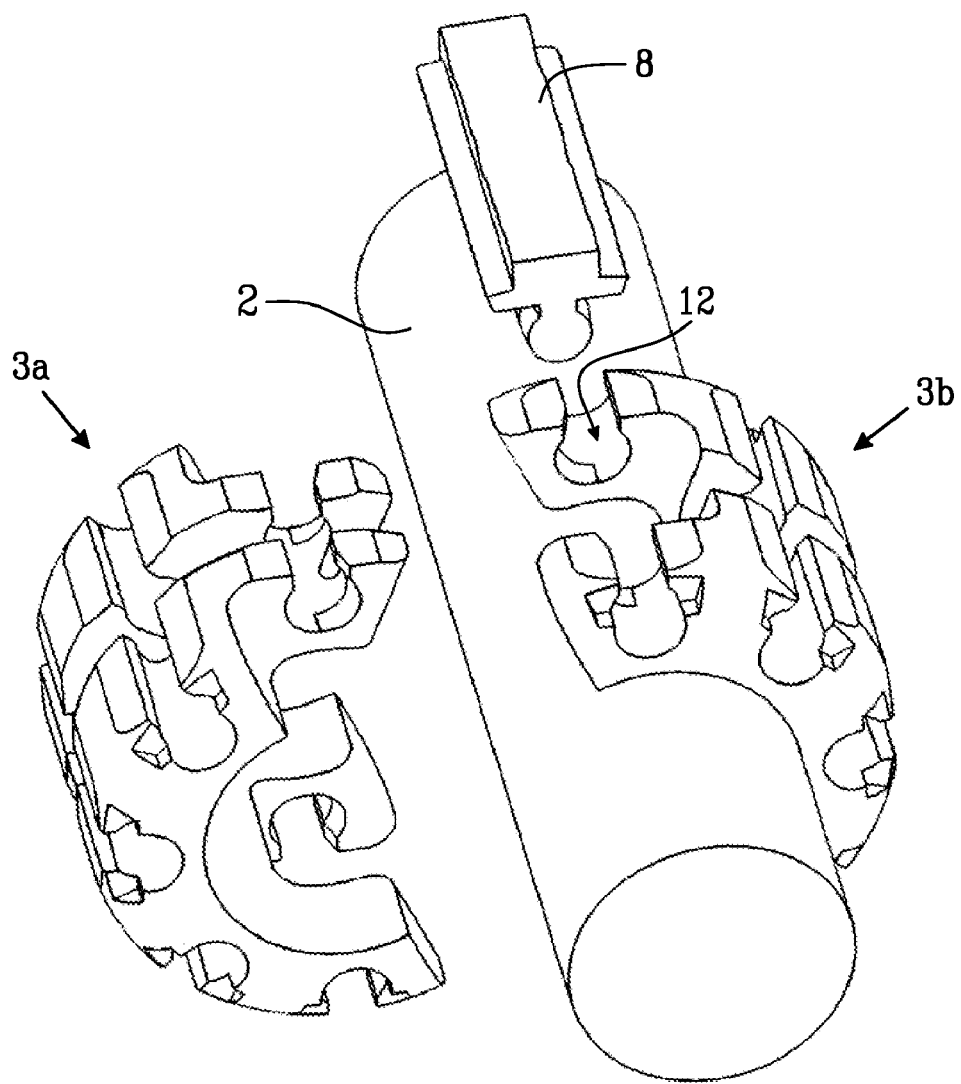
FIGS. 3A-3B (collectively referred to as FIG. 3 below) show how the element is mounted in a first moment on a cylindrical object, whereby part FIG. 3:2 shows the fitting in of the locking bar in an undercut slot.
Figure 3B:
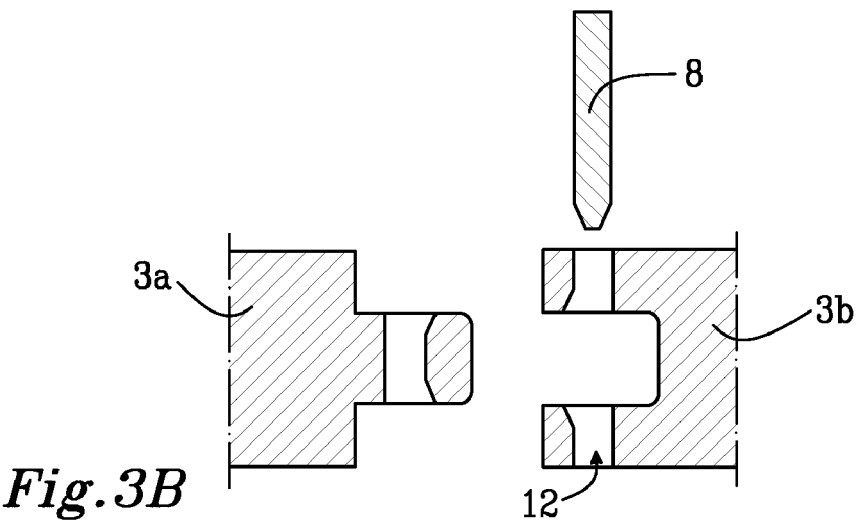
Figure 4A:
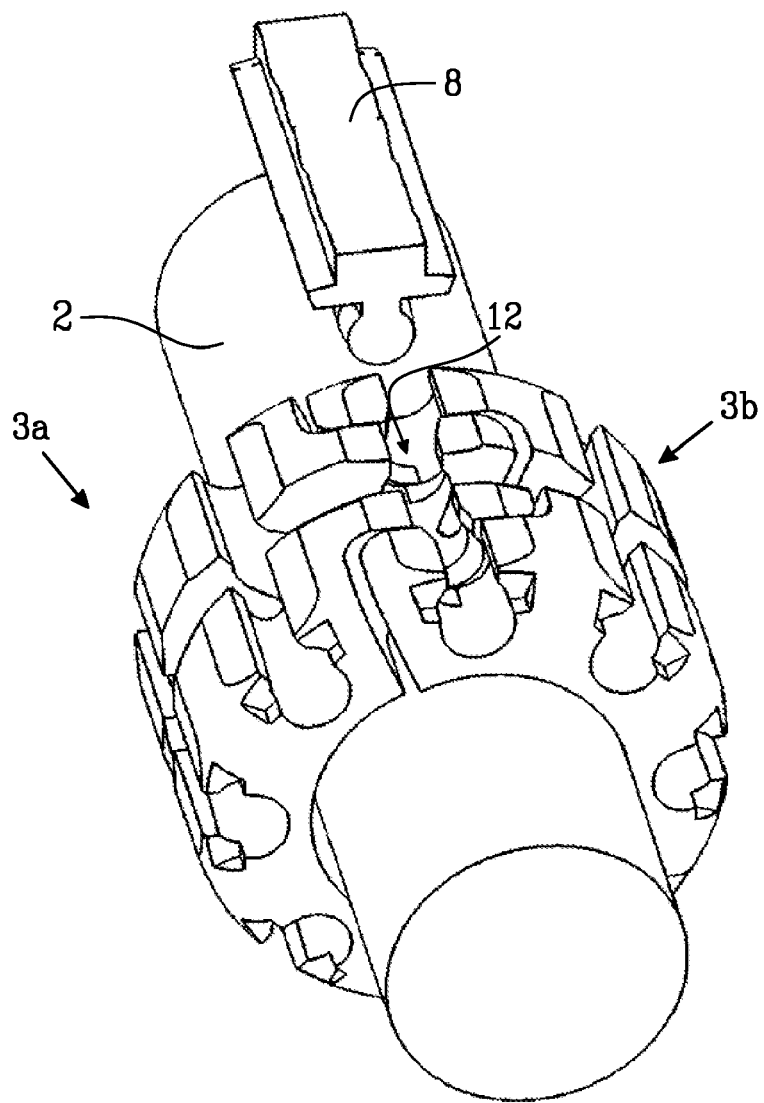
FIGS. 4A-4B (collectively referred to as FIG. 4 below) show how the element is mounted in a second moment onto a cylindrical object, whereby part FIG. 4:2 shows the fitting in of the locking bar in an undercut slot.
Figure 4B:
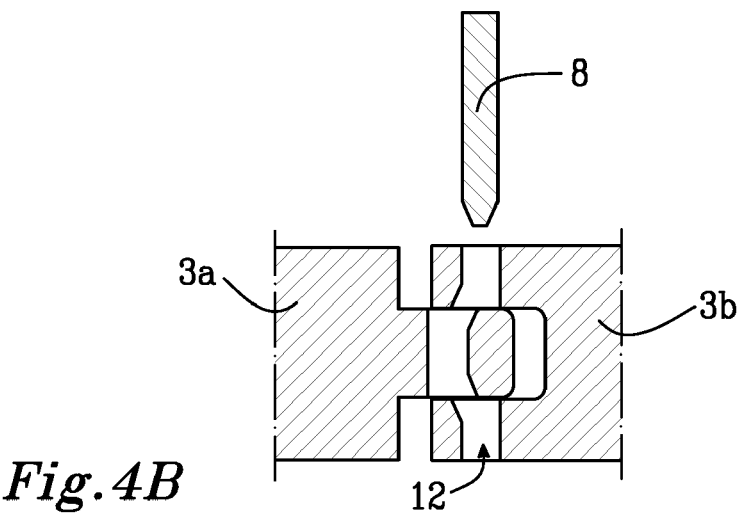
Figure 5A:
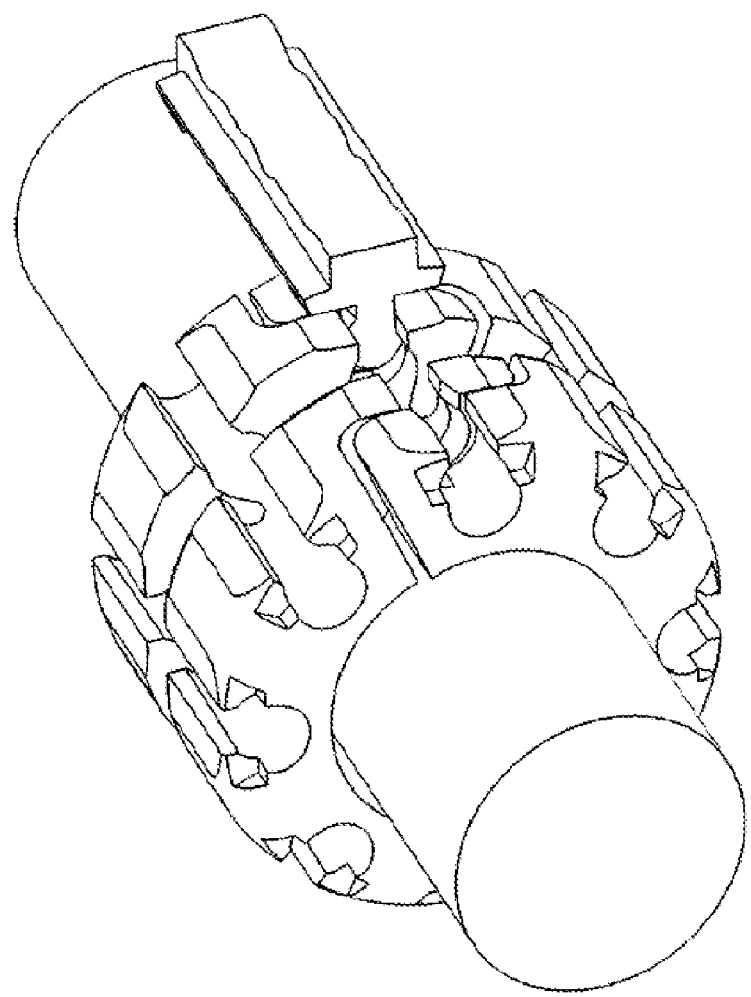
FIGS. 5A-5B (collectively referred to as FIG. 5 below) show how the element is mounted in a third moment onto a cylindrical object, whereby part FIG. 5:2 shows the fitting in of the locking bar in an undercut slot, whereby the chamfered part of the locking bar now has reached the chamfered part of the partition slot.
Figure 5B:
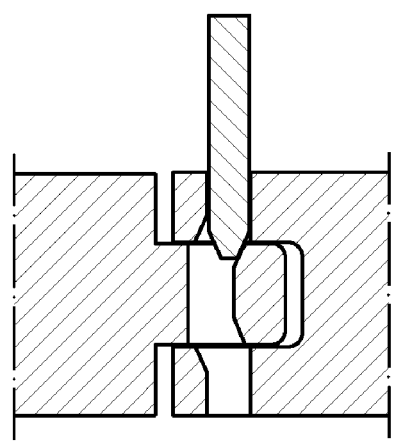
Figure 6A:
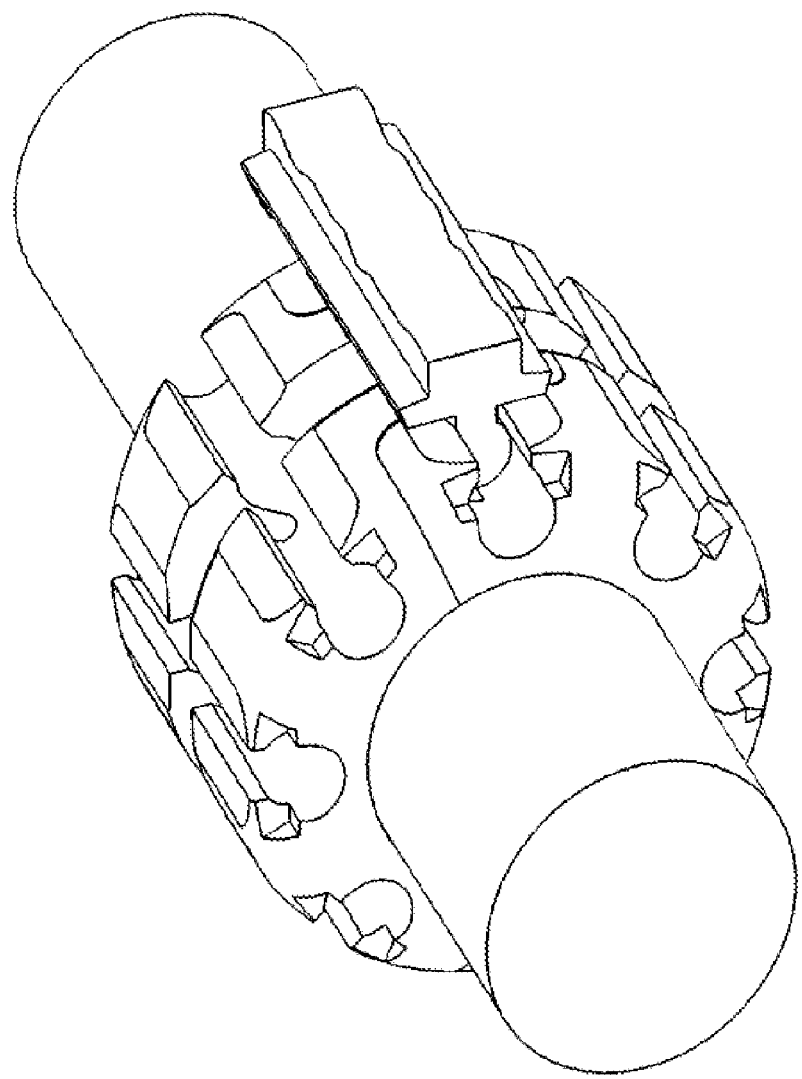
FIGS. 6A-6B (collectively referred to as FIG. 6 below) show how the element is mounted in a fourth moment onto a cylindrical object, whereby part FIG. 6:2 shows the fitting in of the locking bar in an undercut slot, whereby the locking bar has been brought pass the first chamfers and thereby has drawn the clamping element together.
Figure 6B:
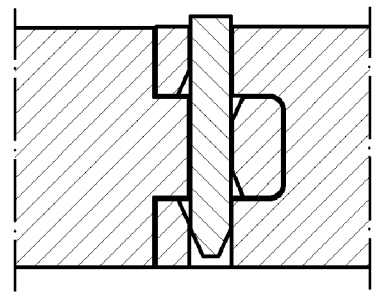
Figure 7A:
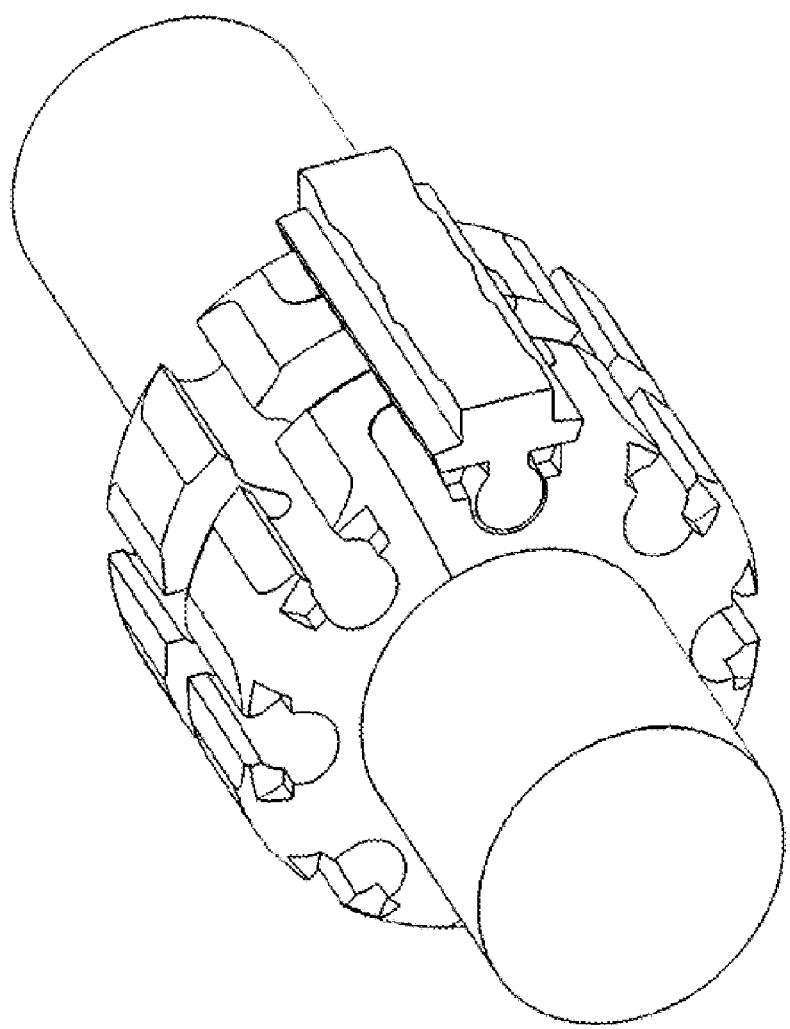
FIGS. 7A-7B (collectively referred to as FIG. 7 below) show how the element is mounted in a last moment onto a cylindrical object, whereby part FIG. 7:2 shows the fitting in of the locking bar in an undercut slot.
Figure 7B:
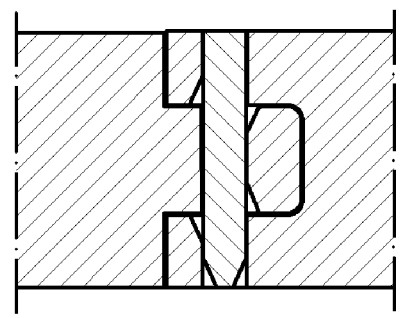

Chamfers 9 present in the partition slots 12 and chamfers on the locking bars 13 together form a wedge system, which allows the locking bars 8 to be brought into the partition slots 12 even if the protrusion slot 10*b* should not be completely aligned with the recess slot 11*a* (cf. FIGS. 3 and 7). When the locking bars 8 have been introduced completely into the two partition slots 12 (cf. FIGS. 5, 6, and 7) the wedge system has contracted the partition slots 12 in such a way that they have become aligned. Thereby a clamping action is obtained between the clamping element 1 and the cylindrical object 2. The clamping element 1 is hereby fixed into its position onto the cylindrical object 2 by frictional force on the surfaces between the clamping element 1 and the cylindrical object 2. The locking bar 8 together with the clamping element 8 is thus the construction element according to the present invention. What is of importance for an approved final mounting and function is that the front chamfer of the locking bar is placed completely within the parallel part 19 of the slot (cf. FIG. 8) i.e., that the parallel surfaces 16 and 19 of the locking bar and the slot meet one another. In other cases the locking bar may slip out of the slot and thereby a non-approved locking will occur.

The slot 6 has, as evident from FIGS. 1 to 7, been shown as an undercut slot, which herein is meant a slot, which along its periphery has a longitudinal opening 22 underneath which the slot 6 extends, substantially as a cylindrical slot, i.e., the slot has a substantially circular cross-section.

The chamfers of the partition slot as well as the locking bars, respectively, are a substantial part of the invention when it relates to locking, clamping clamping elements. Thereby it is important that the chamfer part of the locking bar is transferred into a "longitudinally uniform" part running in parallel to the through going axis of the partition slot so that corresponding parallel surfaces of the partition slot and the locking bar, respectively, rest against each other in order to obtain an efficient locking. The chamfered end of the locking bar may transfer in a weakly countershaped conical shape. The important thing is theta the chamfer of the locking bar being part of the wedge system and contracting the clamping means does not absorb any loads when the locking bar is completely mounted. Otherwise there is a risk that the locking bar slides out of the slot at any load. Hereby the wedge angle is between 15 to 17° to the longitudinal axis of the longitudinally conform part of the clamping element, when a injection moulded polymer is used.

The wedge angle of the chamfers of the partition slots is between 0 and 25° to the through going axis of the partition slot, preferably 3-20°, more preferably 5-20°, still more preferably 10-20°, further more preferably 12-18°, still more preferably 15-17°, specifically between 16.6° to 16.8° to the through going axis of the partition slot. Normally, it is so that the longer the slot is in relation to its width, the smaller may the chamfers or wedge angles be.

The ring halves 3 extend each more than half a turn around the cylindrical object 2, which leads to a snap action which in turn means that the ring halves have some fixing action in themselves. This facilitates a more simple mounting onto the cylindrical object 2 as well as only one ring half 3 may be used if the robustness of the joint between the cylindrical object 2 and the clamping element 1 does not need to be high. The clamping element 1 is made of materials having suitable plastic (flexible and elastic) properties and this means that the locking bars 8 which are introduced into the slots can be drawn out from there in a direction perpendicular to the through going axis 7 of the clamping element without causing any permanent deformation. This means that the clamping element may unfasten instead of falling apart at an overload in those cases when the load works in the plane crossing both the locking bar 8 and the axis 7.

In the embodiments above the placement and use of the clamping element has been shown at cylindrical/round rod objects. It is however understood that the clamping element can be designed to be applied around any rod object having a cross-section of other type than circular, such as polygonal in the form of triangular, quadratic, pentagonal, hexagonal, heptagonal, octagonal, nonagonal, decagonal, and dodecagonal. Certainly the clamping element cannot be moved continuously around such a rod object, but the longitudinal placement is still continuous.

The clamping element can be designed for application around other shapes than longitudinally conform ones and then the clamping element cannot be moved continuously longitudinally or be placed arbitrarily on the application object. If the clamping element should have a cylindrical form in those planes which cuts its through going axis perpendicularly and if these cylindrical forms are placed concentrically the clamping element may, however, be turned continuously around the application object it is intended to become clamped to.

The rod objects can be made of any suitable material such as tree, polymer including composites, and metal. The construction element according to the present invention can be made of suitable a polymer or metal. As suitable polymers ABS-polymer, polyethylene (HD-polyehtylene), polypropylene (HD-polypropylene), polycarbonate and other construction polymers can be used, as well as composites comprising carbon fibre and other fibrous materials. Suitable metals are aluminium, copper, different zinc alloys, different steel qualities, including stainless steel and acid-proof stainless steel, brass, bronze, and other alloys being used as construction materials.

The clamping element can be used in different sizes, such as a toy element, or as a building construction element, i.e., in substantially different scale factors, such as everything from some centimetre or less to some decimetres or more.

Different materials may also be used between clamping element and rod object, Thus the clamping element can be made of a polymer material, while the rod object is made of tree or metal.

The use of a polymer material in the clamping element means that one can obtain a predetermined release if the load in the recess slot exceeds a certain value. When using other, less flexible and elastic materials there is a great risk to obtain breakage/fractures around the partition slots.

Figure 8:
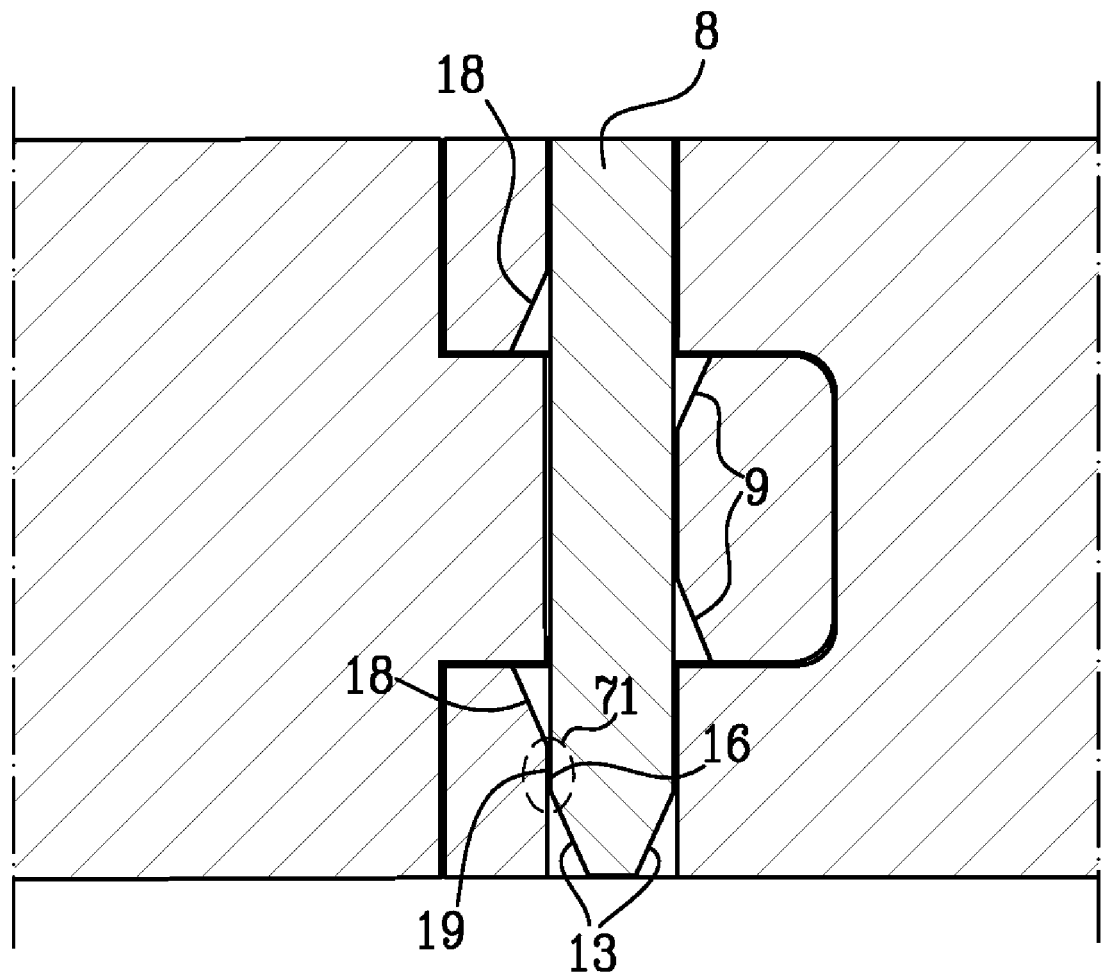
FIG. 8 shows an elevated view of part FIG. 7:2.
Figure 9:
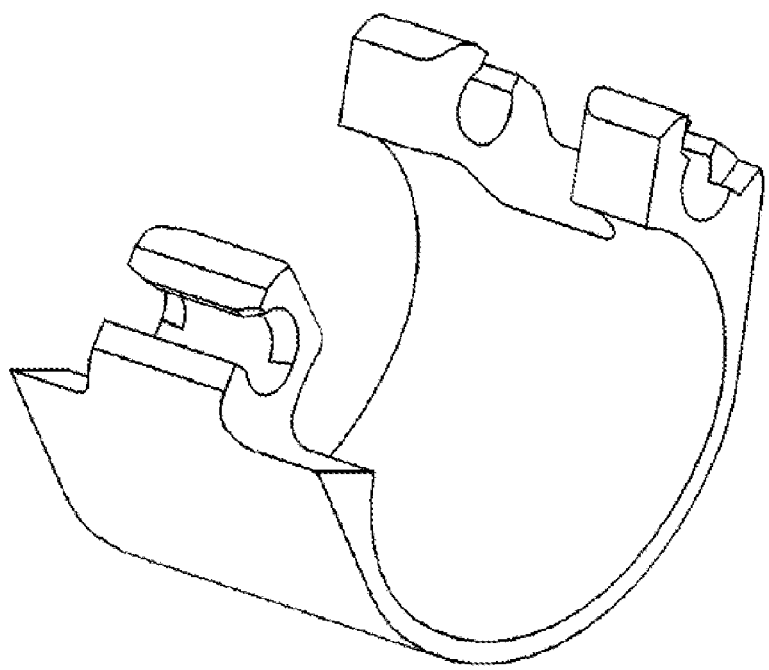
FIG. 9 shows a clamping element having one partition slot only, in an open position.

In the first embodiment above, the clamping element has been shown having two ring halves, whereby it is, however, apparent that one may use a sidewise open ring which is thread over the rod object and which is locked by means of one locking bar only (cf FIGS. 8-9)

The locking bars 8 have normally a substantially cylindrical shape but with an ingoing waist, which leads to that the locking bar draws the outer parts of the slot towards the centre, which means that the clamping element keep together even better. The partition slots as well as the other undercut slots in the longitudinal direction of the element is 0.5 to 10% narrower in the middle, preferably 1 to 6%, more preferably 2 to 5%, still more preferably 3 to 4% narrower in the middle. The undercut slot may also have a slot profile the narrower part of which has a width corresponding to 40 to 80%, preferably 65 to 70% of the wider part of the slot profile.

The ratio length to diameter—i.e., the axial longitudinal extension of the clamping element contra the diameter of the clamping element—is neither critical, whereby, however, there is often reached a better clamping action with a higher friction having a greater length of the clamping element. The normal cross-section of the locking bar 8 is circular, but may very well take any oval shape as well. In case the locking bar has an oval cross-section, then of course the undercut slot will have the similar cross-section.

In the partition slots locking bars having different further functions may be introduced, that is not only having a locking function with regard to the clamping element, but may contain or receive elements such as a hinge, rotation joints of other types than hinges, bars to receive further clamping elements to build a total construction such as e.g., a scaffolding at a house exterior. The bars can also then be simply double sided to receive two clamping elements side by side, parallel to each other or at some angle to each other.

A construction element according to the present invention may thus comprise only two different sorts of parts, four in total of which there are two different details, or in some cases only two different parts, a surrounding clamping element and a locking bar.

Another variant is a so called hinge variant according to FIGS. 14-17. Here one partition slot has been designed as a removable hinge joint, whereby one clamping element comprises an axially longitudinally extending, peripherally arranged rib receiving protrusion 23, and the other clamping element comprises an axially longitudinally extending, peripherally arranged rib surrounding clamp means 24 to the formation of a hinge joint at the bringing together. At the other ends of the clamping elements according the embodiment shown above, viz., having a protrusion and a recess, respectively, to the formation of a continuous undercut slot to receive a locking bar to keep the partition slot together. Here there are three different details making a clamping element (female part half) a clamping element (male part half) and a locking bar.

This hinge construction having a rib receiving and a rib surrounding means, respectively, may be replaced by a removable hinge construction having a through going hinge pin. The hinge pin may hereby be more or less detachably fixed to a through going, axially longitudinally extending, peripherally arranged slot, surrounded or undercut.

Figure 10:
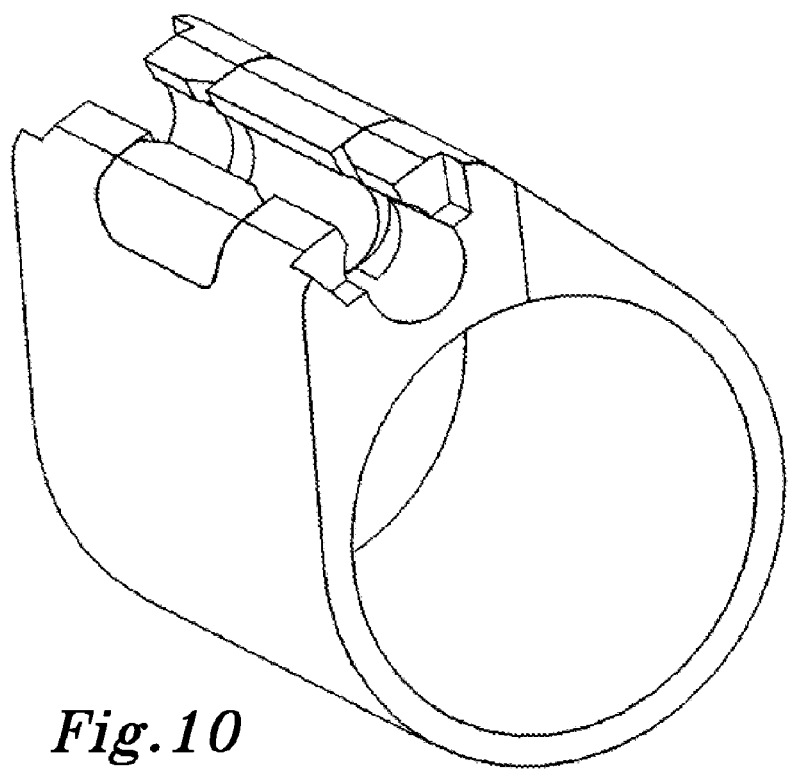
FIG. 10 shows the clamping element according to FIG. 9 in a contracted position.
Figure 11:
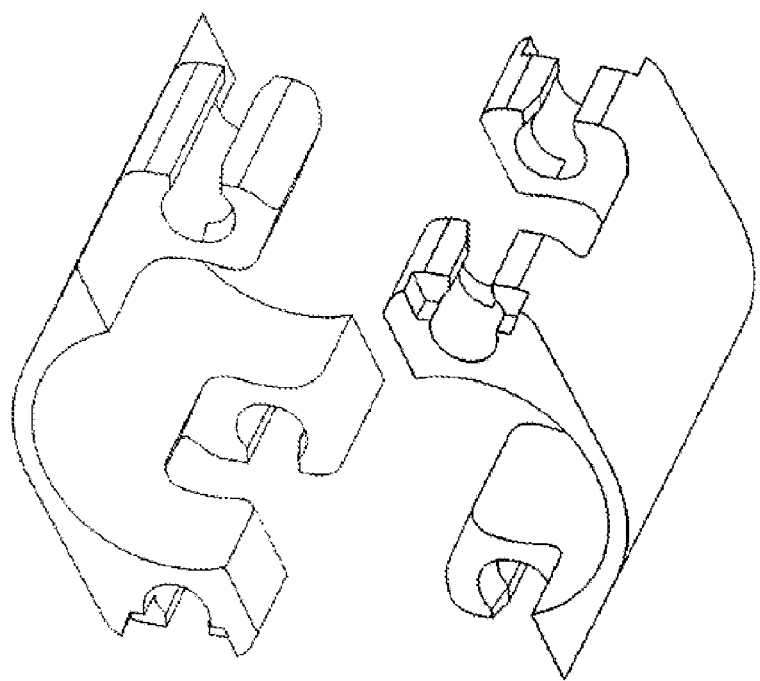
FIG. 11 shows a clamping element according to the present invention having two partition slots only.
Figure 12:
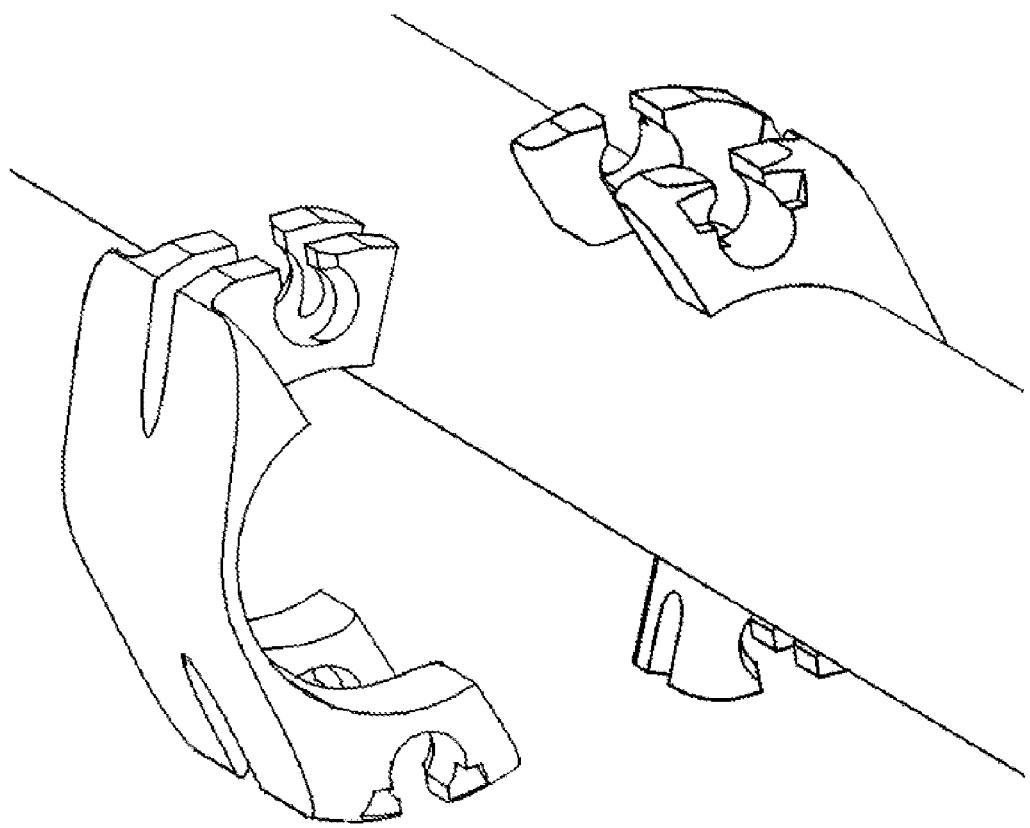
FIG. 12 shows the clamping element according to FIG. 11 partly applied around a cylindrical surface.
Figure 13:
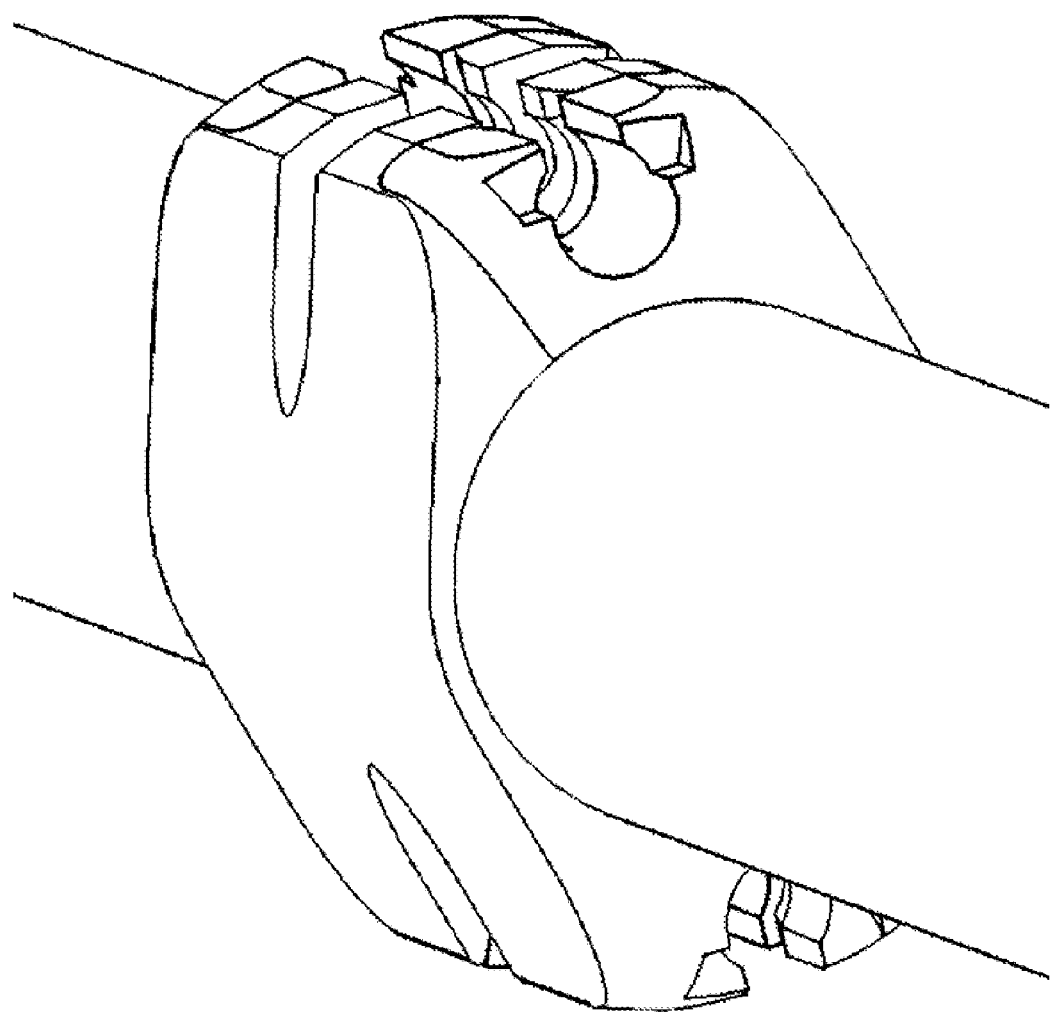
FIG. 13 shows the clamping element according to FIG. 11 wholly applied around a cylindrical surface.
Figure 14:
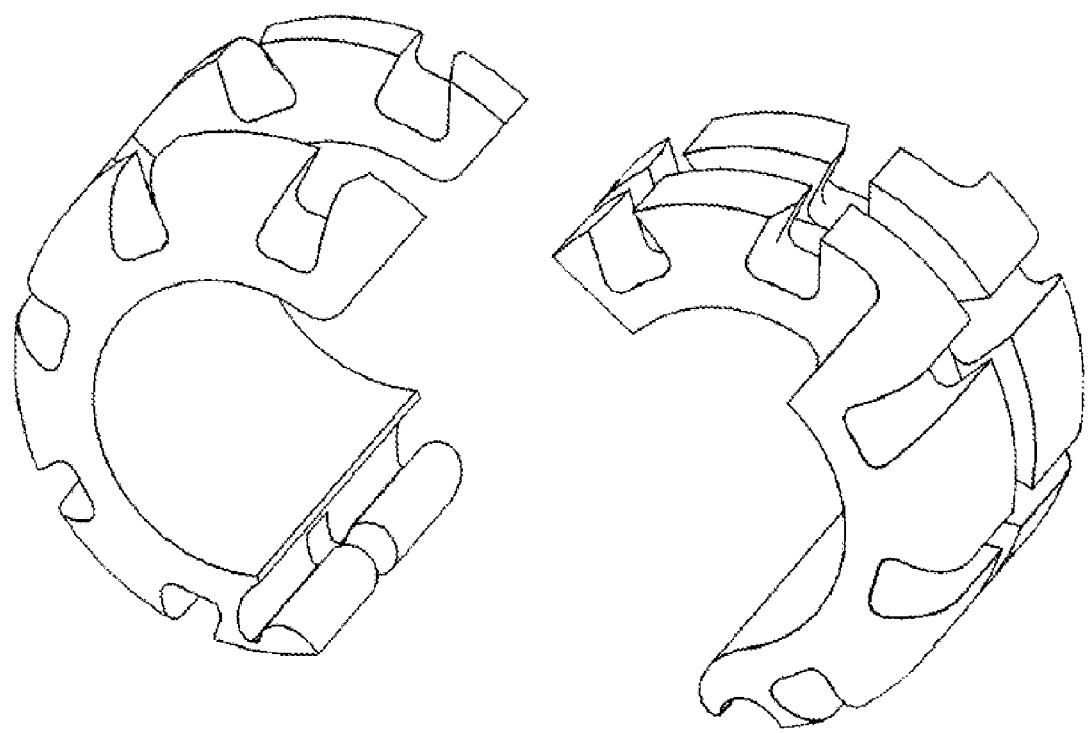
FIG. 14 shows a clamping element according to the present invention having two partition functions, in a non-contracted position.
Figure 15:
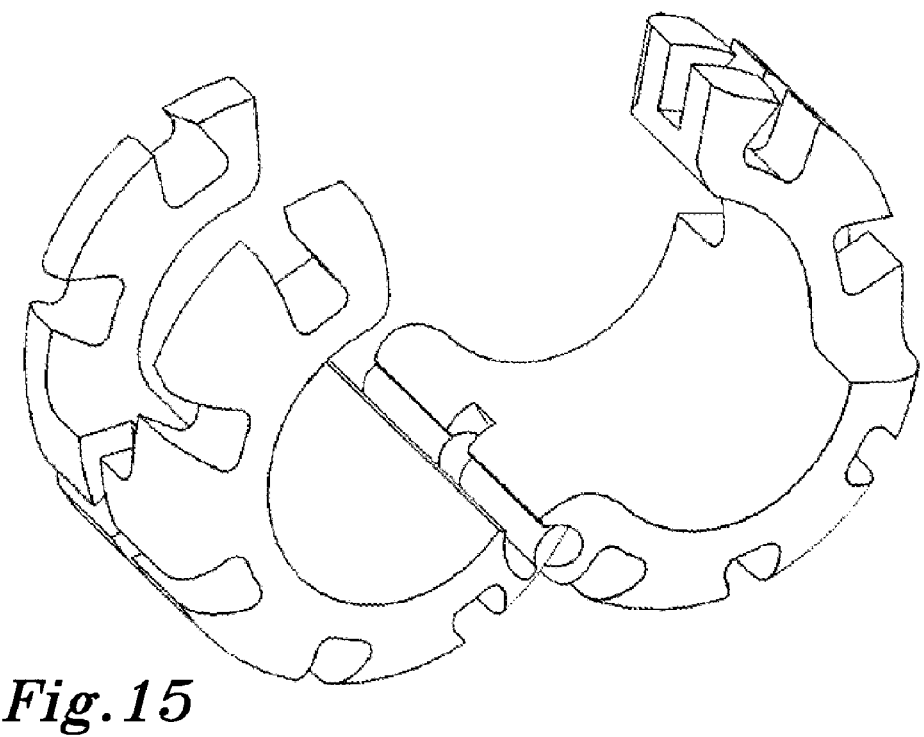
FIG. 15 shows the clamping element according to FIG. 14 having two partition functions, in a contracted state.
Figure 16:
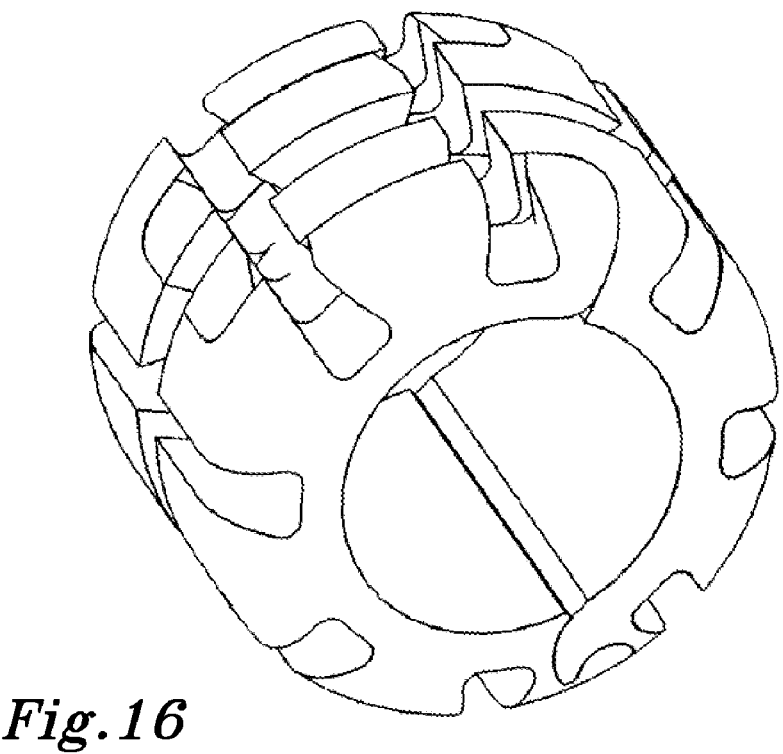
FIG. 16 shows an asymmetrical variant of the clamping element according to FIG. 14 having two partition functions, in a contracted state.
Figure 17:
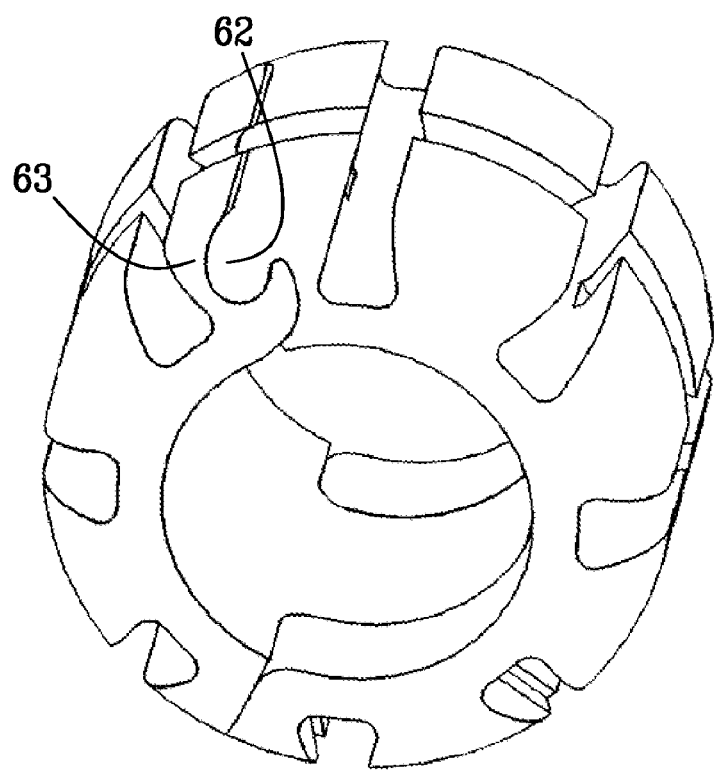
FIG. 17 shows an asymmetrical variant of the clamping element according to FIG. 16 turned 180°.

FIGS. 9-10 show in accordance with the above an embodiment having one clamping element only and a locking bar. The clamping element hereby surrounds the whole turn. Such a clamping element lacks at least one, preferably at least three slots on its side opposite the partition slot to facilitate a more simple bending of the clamping element. This model will thus need only one locking bar to be locked and will thus only encompass two different parts and thereby only two parts in total.

A further embodiment of the present invention comprises a clamping element wherein the partition slot per se is not open towards the periphery of the element but comprises a pin hole being oriented and placed in the same way as the undercut slots shown in FIGS. 1-17 and having the same direction as the through going axis of the clamping element. The locking means here becomes a simple pin having a tapered end. Such an embodiment will thereby not allow any joining to other units to the partition slot plane. Optional joining must thereby be done via other undercut slots or other types of fastening means not being a partition slot.

Locking bars applicable to the undercut slots, either being a partition slot or a fastening slot can receive different other functional elements. Thus the bar may receive one more locking bar and thus become a double locking bar to receive two clamping element rings to each other. A ball joint may be connected to or be a part of the bar, a hinge joint may be connected to or be a part of the bar, elements compatible with other construction elements may be connected hereto or be a part of the bar.

Figure 18:
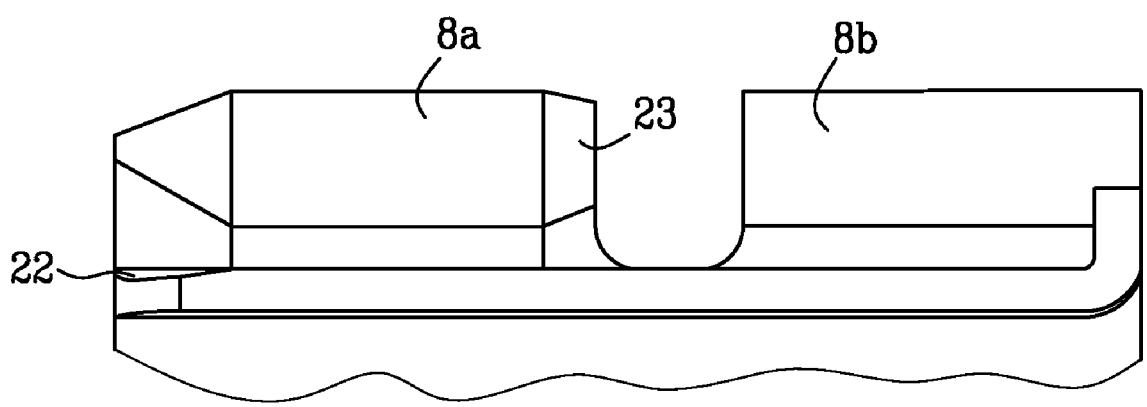
FIG. 18 shows a second embodiment of a locking means of the invention.

It is also important to be able to lock the locking bar to the clamping elements. Hereby the clamping elements and the locking bar a peripherally, radially to the axis of the construction element directed second slot 20 arranged in the clamping element and a corresponding slot 21 present in the locking bar, which are arranged to receive a second locking means, such as for example a wire or flexible ring provided with a lock. Such locking may be necessary when used in public, e.g., when providing road signs. FIG. 18 shows a further embodiment of the locking means, whereby the locking bar is present divided into two parts 8*a* and 8*b*, to allow for a second locking wire or ring, which then may be rotated in the slot 20 to be placed in any position. The locking bar 8*a*, 8*b* has bevelled surfaces 22 to provide for a more smooth introduction and elimination of the locking means 8 from the undercut slot. As evident from FIG. 18 there is a further bevelled surface 23 applied, which may facilitate the introduction of the locking bar 8, 8*a*, 8*b* further into the undercut slot.

The invention claimed is:

1. A construction element in the form of an openable ring mountable on a rod member, the construction element comprising:
    two clamping elements, each defining a ring portion and having one circumferential facing end face with a protrusion, and an opposing circumferential facing end face with a recess extending radially between inner and outer surfaces of the clamping element that receives the protrusion of the other clamping element when the construction element is mounted on the rod member;
    two partition slots, each defined by a protrusion slot extending through the protrusion of one of the clamping elements and a recess slot extending through opposing walls of the corresponding recess of the other clamping element, each partition slot being formed by a protrusion sot and recess slot when the protrusions are received within the recesses such that the partition slot extends parallel to a longitudinal axis of the construction element;
    wherein each protrusion slot and recess slot is undercut into a circumferential peripheral surface of the respective clamping element and has a substantially circular or oval cross-section and a longitudinal opening facing outward; and
    two locking bars each being receivable into a respective partition slot when the protrusions are received within the recesses, wherein each of the locking bars has a chamfered end which transitions to a part of the locking bar that is parallel to engaging surfaces of a corresponding partition slot;
    wherein chamfers are arranged on opposing sides of each protrusion slot and confronting sides of the opposing walls of each respective recess slot, such that the chamfers on the protrusion slots and the recess slots together with the chamfers on the locking bars form a wedge system;
    wherein each clamping element includes at least one fastening slot undercut into the circumferential peripheral surface of the clamping element, parallel to the partition slots, having a substantially circular or oval cross-section and a longitudinal opening facing outward, and being configured to receive a mating connection element for attaching to additional clamping elements or other rod members.

2. The construction element according to claim 1, wherein wedge angles of the chamfers on the protrusion slot and the recess slot is equal to the wedge angles of the chamfers present on the locking bars.

3. The construction element according to claim 2, wherein the wedge angles of the chamfers is between 0.5 to 25 degrees to the through going axis of the partition slot.

4. The construction element according to claim 2, wherein the wedge angles of the chamfers is between 15 to 17 degrees to the through going axis of the partition slot.

5. The construction element according to claim 2, wherein the wedge angles of the chamfers is between 16.6 to 16.8 degrees to the through going axis of the partition slot; and
    wherein the clamping elements are fabricated from an injection moulded polymer.

6. The construction element according to claim 2, wherein the wedge angle of the chamfers is between 5 and 6 degrees to the through going axis of the partition slot; and
    wherein the clamping elements are fabricated from metal.

7. The construction element according to claim 6, wherein each of the partition slots and the fastening slots of the clamping elements has a slot profile with a narrower part that has a width corresponding to 40 to 80% of a widest part of the slot profile.

8. The construction element according to claim 1, wherein the locking bars reach through at least 80% of the total length of the partition slots.

9. The construction element according to claim 1, wherein the profile of the locking bars completely or partly reach the surface of the profile of the partition slots.

10. The construction element according to claim 1, wherein each of the clamping elements and each of the locking bars is provided with a peripheral, radial slot extending longitudinally in a direction perpendicular to the axis of the construction element and arranged to receive second locking means, the peripheral, radial slot in each of the clamping elements intersecting the partition slot; and
    wherein the second locking means is one of a wire and a flexible ring provided with a lock and received in the peripheral, radial slot.

11. The construction element according to claim 1, wherein there are one of 2, 3, 4, 5, 6, 7, 8, 9 or 10 fastening slots.

12. The construction element according to claim 1, wherein each of the partition slots and the fastening slots in the longitudinal direction of the clamping elements is 0.5 to 10% narrower at the middle thereof.

13. The construction element according to claim 1, wherein the wedge angle of the chamfers is between 5.4 to 5.6 degrees to the through going axis of the partition slot; and
    wherein the clamping elements are fabricated from metal.

14. The construction element according to claim 1, wherein each of the fastening slots of the clamping elements has a slot profile with a narrower part that has a width corresponding 65 to 70% of a widest part of the slot profile.

15. The construction element according to claim 1, wherein each of the partition slots and the fastening slots in the longitudinal direction of the clamping elements is 1-6% narrower at the middle thereof.

16. The construction element according to claim 1, wherein the clamping elements are fabricated from a polymer material.

* * * * *